(12) United States Patent
Ahmed et al.

(10) Patent No.: US 12,184,033 B1
(45) Date of Patent: Dec. 31, 2024

(54) HIGH OPTICAL GAIN LASER MEDIA-BASED ON CHALCONE COMPOUND DERIVATIVES

(71) Applicant: IMAM MOHAMMAD IBN SAUD ISLAMIC UNIVERSITY, Riyadh (SA)

(72) Inventors: Khalid Hassan Ibnouf Ahmed, Riyadh (SA); Osamah Abdulrahman Aldaghri, Riyadh (SA); Hajo Idriss Mohammed Idriss, Riyadh (SA); Amin Osman Elzupir Alamalhuda, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/417,606

(22) Filed: Jan. 19, 2024

(51) Int. Cl.
*H01S 3/094* (2006.01)
*C09K 11/02* (2006.01)
(Continued)

(52) U.S. Cl.
CPC .............. *H01S 3/20* (2013.01); *C09K 11/025* (2013.01); *C09K 11/06* (2013.01); *H01S 3/094* (2013.01);
(Continued)

(58) Field of Classification Search
CPC .......... H01S 3/094; H01S 3/20; H01S 3/1611; H01S 3/1643; H01S 2301/02;
(Continued)

(56) References Cited

FOREIGN PATENT DOCUMENTS

| CN | 114644564 A | 6/2022 |
|---|---|---|
| JP | 4202804 B2 | 12/2008 |

OTHER PUBLICATIONS

M F Attia, Abdelrahman A Elbadawi, K H Ibnaouf and AO Elzupir, Influence of Functional Groups on the Photophysical Properties of Msppp Chalcone as Laser Dye, Attia, Res J Opt Photonics 2020, 5:2, 1-4. (Year: 2020).*

(Continued)

*Primary Examiner* — Bijan Ahvazi
(74) *Attorney, Agent, or Firm* — Oblon, McClelland, Maier & Neustadt, L.L.P.

(57) ABSTRACT

A laser device includes a medium container, a gain medium contained in the medium container and optics configured to direct the laser to a sample. The optics preferably include no optical resonator around the gain medium. The gain medium is configured to receive energy to emit a laser and includes a first solvent and a compound dissolved therein. The compound conforms to formula (1):

formula (1)

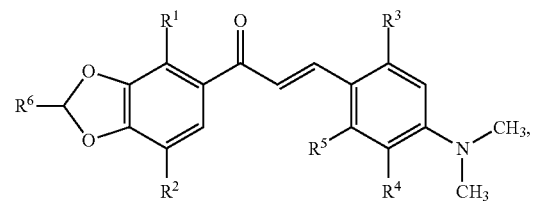

where $R^1$, $R^2$, $R^3$, $R^4$, $R^5$ and $R^6$ are each independently hydrogen or an alkyl group. The laser media can function in (Continued)

both liquid as well as solid state and has shown a high optical gain of the order of 3.2 cm$^{-1}$ in pulsed and continuous wave modes.

20 Claims, 4 Drawing Sheets

(51) Int. Cl.
 *C09K 11/06* (2006.01)
 *H01S 3/16* (2006.01)
 *H01S 3/20* (2006.01)

(52) U.S. Cl.
 CPC .......... *H01S 3/1611* (2013.01); *H01S 3/1643* (2013.01); *C09K 2211/1007* (2013.01); *C09K 2211/1018* (2013.01); *H01S 2301/02* (2013.01)

(58) Field of Classification Search
 CPC .................. C09K 11/025; C09K 11/06; C09K 2211/1007; C09K 2211/1018
 See application file for complete search history.

(56) References Cited

OTHER PUBLICATIONS

K.H. Ibnaouf, A.O. Elzupir, M.S. AlSalhi, Abdulaziz S. Alaamer, Influence of functional groups on the photophysical properties of dimethylamino chalcones as laser dyes,Optical Materials 76 (2018) 216-221 (Year: 2018).*

Attia et al. ; The Efficacy of New Liquid Laser Dye Material—Chalcone: 1-(4-methylsulfonyl phenyl)-3-(4-N,N-dimethyl (amino phenyl)-2-propen-1-one (MSPPP) ; The Electronic Journal of Chemistry, 14(2) ; 2022 ; 7 Pages.

Elzupir et al. ; Synthesis and Characterization of an Efficient New Liquid Laser Dye Material—Chalcone (DMAPPP) ; Acta Physica Polonica A, vol. 133 ; Dec. 17, 2017 ; 5 Pages.

* cited by examiner

HIGH OPTICAL GAIN LASER MEDIA-BASED ON CHALCONE COMPOUND DERIVATIVES

BACKGROUND

Technical Field

The present disclosure is directed to laser media, particularly to laser media based on chalcone compound derivatives that can function in both pulsed and continuous wave modes.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Lasers find uses in various industrial applications, especially in medicine and engineering. Different types of lasers use different types of gain media for their functioning. For example, solid-state lasers use solid gain media, while liquid lasers use solvent-based media for optimum optical gain. Common examples of laser media that can be either liquid or solid or both are dyes that are in a liquid state or conjugated polymers [See: Elzupir, A. O., et al., *Ultrasound Irradiation Promoted Synthesis Of Chalcones, Analogues, Homologues And Related Furanyl Containing Compounds And Their Antibacterial Activity. Int J Curr Pharm Res.* 5 (4): p. 23-25]. Also, some lasers can function in a continuous wave mode, and some can serve as pulsed beam lasers. Despite years of research, there are only a few lasers, such as rhodamine 6G and rhodamine B, which work in both a liquid state and continuous wave mode [See: Go, M., X. Wu, and X. Liu, *Chalcones: an update on cytotoxic and chemoprotective properties. Current medicinal chemistry,* 2005. 12 (4): p. 483-499]. However, these lasers have a minimal operating range of 550 to 630 nm and function poorly in the solid state.

CN114644564A discloses an organic solid laser based on a cascade excited state proton transfer laser molecular single crystal material. The laser therein is pumped by a 532 nm pulsed laser to achieve a near-infrared laser with a communication band of about 850 nm. However, such lasers function only as near-infrared and cannot operate in liquid media.

Chalcones, a group of polyphenolic compounds, are currently being explored for their laser properties. Chalcones are chemical compounds consisting of two phenyl rings connected by a bridge-like enone functional group. The functionality of chalcone derivatives is a carbonyl group conjugated with a carbon-carbon double bond, often known as an unsaturated keto group or an enone structure. The most significant characteristic of a chalcone is that the entire molecule is conjugated. Consequently, their electron density is very mobile via the orbital system. Through intramolecular charge transfer (ICT), the N,N-dimethyl amino group linked to the para-position of ring B in chalcones improves its photophysical properties [See: Gaber, M. et al., *Photophysical properties, laser activity and photoreactivity of a heteroaryl chalcone: a model of the solvatochromic fluorophore. Optics & Laser Technology,* 2008. 40 (3): p. 528-537]. When N, N-dimethylamino or pyrrolidinyl groups are added to ring B's para position, the photophysical characteristics of these chalcones are significantly increased [See: Elzupir, A., et al., *Synthesis and characterization of an efficient new liquid laser dye material-chalcone (DMAPPP). Acta Physica Polonica A,* 2018. 133 (1): p. 121-125; Ibnaouf, K., et al., *Influence of functional groups on the photophysical properties of dimethylamino chalcones as laser dyes. Optical Materials,* 2018. 76: p. 216-221; Attia, M. F., *Synthesis, Properties of a New (Polymer and Chalcone). Asian Journal of Physical and Chemical Sciences,* 2019: p. 1-9.]

A variety of N, N-dimethylamino chalcones have been prepared, and their optical activities found to be superior to those of coumarin 503 [See: Ibnaouf, K. et al., *Influence of functional groups on the photophysical properties of dimethylamino chalcones as laser dyes. Optical Materials,* 2018. 76: p. 216-221; Ibnaouf, K., et al., *Spectral And Ase Properties Of An Amino Chalcone 1-(4-Chlorophenyl)-3-(4-N, N Dimethylamino Phenyl)-2-Propen-1-One. Digest Journal Of Nanomaterials And Biostructures,* 2017. 12 (2): p. 423-430; Sharshira, E. M., R. I. El Sokkary, and N. Morsy, *Synthesis and antimicrobial evaluation of some heterocyclic compounds from 3-aryl-1-phenyl-1H-pyrazole-4-carbaldehydes. Zeitschrift für Naturforschung B,* 2018. 73 (6): p. 389-397]. Another chalcone derivative, 1-(4-methylsulfonyl phenyl)-3-(4-N,N-dimethyl(amino phenyl)-2-propen-1-one (MSPPP) was investigated for its application as a laser medium [See: Attia et. al *The Efficacy of New Liquid Laser Dye Material-Chalcone: 1-(4-methylsulfonyl phenyl)-3-(4-N,N-dimethyl (amino phenyl)-2-propen-1-one (MSPPP) Orbital*—The Electronic Journal of Chemistry July 2022, 14 (2): 82-88)]. Another molecule, 3-(4-(dimethylamino)phenyl)-1-phenyl-(2E)-propen-1-one (DMAPPP), and its application as a new laser medium have been described. [See: Amin Elzupir, K. H. Ibnaouf, Hajo Idriss, M. A. Ibrahem. *Synthesis and Characterization of an Efficient New Liquid Laser Dye Material-Chalcone (DMAPPP) Acta Physica Polonica Series a.* January 2018 133 (1): 121-125].

The choice of laser media also depends upon the tunability of lasers emitted from such media. Many applications require lasers that can be tuned across various ranges of wavelengths. However, only a few laser media exist currently which emit lasers that can be tuned to desired wavelengths. Some solid-state lasers allow tuning of wavelengths at 570 nm and above. Ti-sapphire solid-state lasers are available in the market but are only tunable from 800 to 900 nm.

Each of the aforementioned laser systems and media suffer from one or more drawbacks hindering their adoption. Hence, a need remains to develop tunable laser systems and media that can function well in both liquid and solid states. Accordingly, one object of the present disclosure is to provide a laser tunable to wavelengths below 570 nm and capable of working in pulsed and continuous wave modes in liquid or solid state.

SUMMARY

In an exemplary embodiment, a laser device is disclosed. The laser device includes a medium container, a gain medium contained in the medium container and optics configured to direct the laser. The optics includes no optical resonator around the gain medium. The gain medium is configured to receive energy to emit a laser via amplified spontaneous emission (ASE).

In another exemplary embodiment, the gain medium includes a first solvent and a compound dissolved therein. The compound conforms to formula (1):

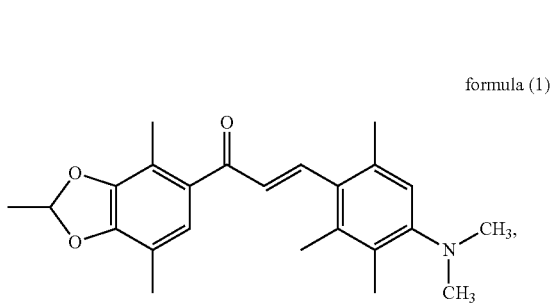 [SMILES: Cc1cc(N(C)C)c(C)c(C)c1/C=C/C(=O)c1cc(C)c2c(c1C)OC(C)O2]

formula (1)

where $R^1$, $R^2$, $R^3$, $R^4$, $R^5$ and $R^6$ are each independently hydrogen or an alkyl group.

In another exemplary embodiment, the first solvent includes at least one selected from the group consisting of ethylene glycol and water.

In another exemplary embodiment, the gain medium includes a second solvent. The second solvent is selected from the group consisting of acetone, ethanol and dimethylformamide.

In some embodiments, the compound in solid state conforms to formula (1):

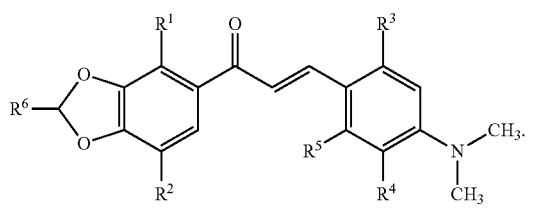

formula (1)

$R^1$, $R^2$, $R^3$, $R^4$ and $R^6$ are each independently hydrogen or an aliphatic group having 1 to 6 carbon atoms, and $R^5$ is hydrogen, a methyl group or an ethyl group.

In some embodiments, the compound in solid state conforms to formula (1):

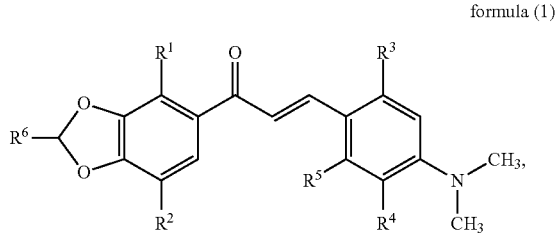

formula (1)

$R^1$, $R^2$, $R^3$ and $R^4$ are each independently hydrogen, a methyl group, an ethyl group or a propyl group, and $R^5$ is hydrogen or a methyl group.

In some embodiments, the compound in solid state conforms to formula (1):

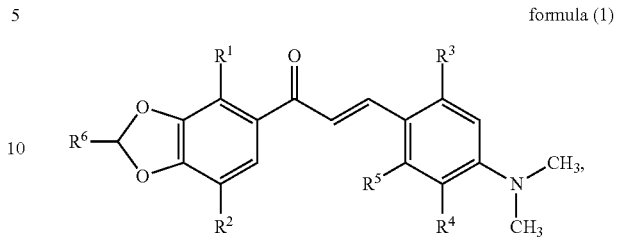

formula (1)

$R^1$, $R^2$, $R^3$, $R^4$ and $R^6$ are each independently hydrogen or a substituted heteroalkyl group having 1 to 6 carbon atoms.

In some embodiments, the compound in solid state conforms to formula (1):

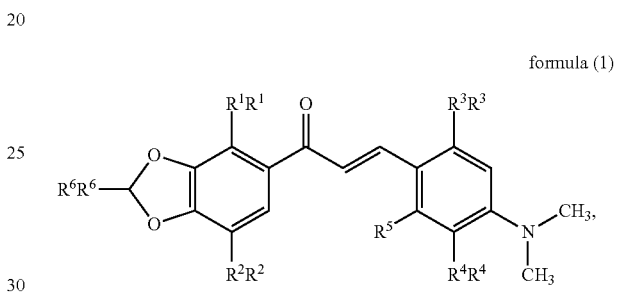

formula (1)

$R^1$, $R^2$, $R^3$, $R^4$, $R^5$ and $R^6$ are hydrogen.

In some embodiments, a pump source is configured to provide actinic energy to the gain medium so that the gain medium is excited to emit the laser.

In some embodiments, the gain medium is configured to emit the laser in a range of 525-580 nm, and the compound has a concentration of 0.1-8.0 mg/mL in the gain medium.

In an exemplary embodiment, a method of laser production is described. The method includes providing energy to a gain medium so that the gain medium emits a laser in a range of 525-580 nm via amplified spontaneous emission (ASE). The gain medium includes a first solvent and a compound dissolved therein, the compound has a concentration of 0.1-8.0 mg/mL in the gain medium, the compound conforms to formula (1):

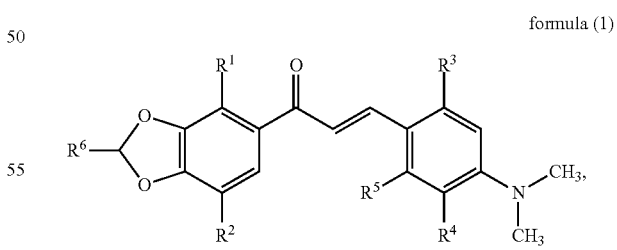

formula (1)

$R^1$, $R^2$, $R^3$, $R^4$, $R^5$ and $R^6$ are each independently hydrogen or an alkyl group.

In some embodiments, the method includes providing energy to the gain medium in a pulsed or continuous-wave mode.

In an exemplary embodiment, a laser device is disclosed. The laser device includes a medium container, a gain medium contained in the medium container and configured to receive energy to emit a laser via amplified spontaneous emission (ASE), and optics configured to direct the laser. The optics include no optical resonator around the gain medium. The gain medium includes a compound in solid state and no solvent. The compound conforms to formula (1):

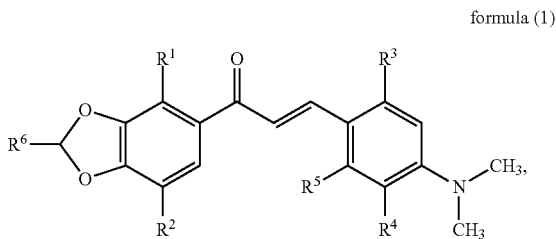

formula (1)

$R^1$, $R^2$, $R^3$, $R^4$, $R^5$ and $R^6$ are each independently hydrogen or an alkyl group.

In some embodiments, the compound in solid state conforms to formula (1):

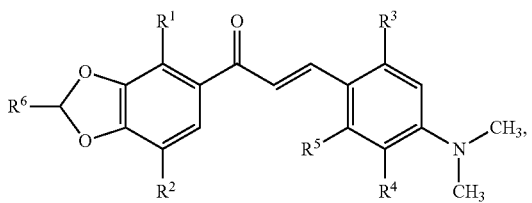

formula (1)

$R^1$, $R^2$, $R^3$, $R^4$ and $R^6$ are each independently hydrogen or an aliphatic group having 1 to 6 carbon atoms, and $R^5$ is hydrogen, a methyl group or an ethyl group.

In some embodiments, the compound in solid state conforms to formula (1):

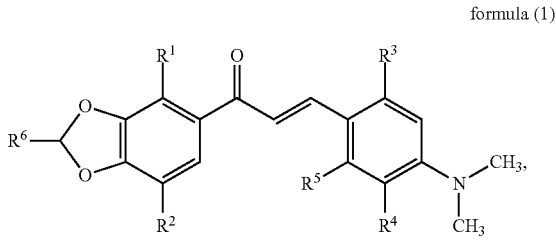

formula (1)

$R^1$, $R^2$, $R^3$, $R^4$, $R^5$ and $R^6$ are hydrogen.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
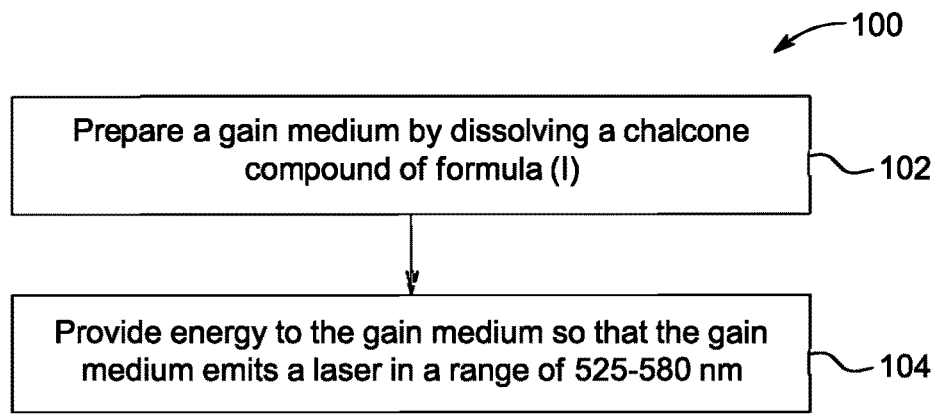
FIG. 1 is a schematic diagram depicting a method of laser production using a laser medium, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, "compound" refers to a chemical entity, whether as a solid, liquid, or gas, and whether in a crude mixture or isolated and purified.

As used herein, "chalcone compound" refers to a group of polyphenolic compounds that can act as bioactive substances, fluorescent materials, and chemical intermediates. Their basic structure is composed of two phenyl rings connected by a bridge-like enone functional group.

As used herein, "derivative" refers to a compound derived from a parent compound by a chemical reaction in which one or more atoms from the parent compound are replaced with other atoms or functional groups.

As used herein, "gain medium" or "laser medium" refers to a medium that can optically amplify laser beams using stimulated emission. Stimulated emission occurs when radiation from one atom stimulates another, and this chain reaction continues until all the excited atoms return to their normal or lower energy state.

As used herein, "solvent" refers to a liquid capable of dissolving one or more solutes to form a solution. Solvents in the case of laser medium may include water, alcohols, benzenes, hexane, toluene, cyclohexane, glycols, and dimethylformamide.

As used herein, "concentration" refers to a measure of the quantity of solute dissolved in a given quantity of solvent or a solution.

As used herein, "optical gain" refers to a measure of the ability of a laser medium to amplify the output when excited by an external energy source.

As used herein, "amplified spontaneous emission" (ASE) refers to the spontaneous emission of light that has been optically amplified when the gain medium is excited by a pump source.

As used herein, the term "alkyl", as used herein, unless otherwise specified, refers to a straight, or branched hydrocarbon fragment. Non-limiting examples of such hydrocarbon fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, and 2,3-dimethylbutyl.

As used herein, the term "substituted" refers to at least one hydrogen atom replaced with a non-hydrogen group, provided that normal valencies are maintained and the substitution results in a stable compound. When a compound or a R group (denoted as $R^1$, $R^2$, and so forth) is noted as "optionally substituted", the substituents are selected from the exemplary group including, but not limited to, aroyl (as defined hereinafter), halogen (e.g. chlorine, bromine, fluorine or iodine), alkoxy (i.e. straight or branched chain alkoxy having 1 to 10 carbon atoms, and includes, for example, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy), cycloalkyloxy including cyclopentyloxy, cyclohexyloxy, and cycloheptyloxy, aryloxy including phenoxy and phenoxy substituted with halo, alkyl, alkoxy, and haloalkyl (which refers to straight or branched chain alkyl having 1 to 8 carbon atoms which are substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-difluorobutyl, trichloromethyl, trifluoromethyl, 2,2,2-tri-fluoroethyl, 2,3,3-trifluoropropyl, 1,1,2,2-tetrafluoroethyl, 2,2,3,3-tetrafluoropropyl), hydrocarbyl, arylalkyl, hydroxy, alkoxy, oxo, alkanoyl, alkanoyloxy, amino, alkylamino, arylamino, arylalkylamino, disubstituted amines (e.g.

in which the two amino substituents are selected from the exemplary group including, but not limited to, alkyl, aryl, or arylalkyl), alkanylamino, arylamino, alkanoylamino, thiol, alkylthio, arylthio, arylalkylthio, alkylthiono, arylthiono, aryalkylthiono, alkylsulfonyl, arylsulfonyl, arylalkylsulfonyl, sulfonamido (e.g. —$SO_2NH_2$), substituted sulfonamide, nitro, cyano, carboxy, carbamyl (e.g. —$CONH_2$, —CONHalkyl, —CONHaryl, —CONHarylalkyl or cases where there are two substituents on one nitrogen from alkyl, aryl, or arylalkyl), alkoxycarbonyl, aryl, guanidine, heteroarylcarbonyl, heterocyclyl, and mixtures thereof and the like. The substituents may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety).

As used herein, the term "unsubstituted alkyl" refers to an alkyl group that may be linear or branched and does not have any hydrogen atom that is replaced with a non-hydrogen group. Exemplary unsubstituted alkyl group includes, without limitation, methyl, ethyl, propyl, isopropyl, butyl, tert-butyl, sec-butyl, isobutyl, pentyl, and hexyl.

The present disclosure is intended to include all hydration states of a given compound or formula unless otherwise noted or when heating a material. Unless otherwise noted, the present disclosure is intended to include all isotopes of a given compound or formula.

Aspects of the present disclosure are directed to laser media based on chalcone compounds that can function both as continuous wave and pulsed laser media. More particularly, aspects of the present disclosure are directed to synthesizing chalcone compound derivatives with N, N-dimethylamino groups and their use as laser media giving high optical gain.

One such compound, 1-(2H-1,3-benzodioxol-5-phenyl)-3-[4-(dimethylamino)phenyl]-(2E)-propen-1-one (BDP), was synthesized and investigated for its ability to function as laser medium. The absorption, fluorescence, and laser spectra of the synthesized compound BDP showed a significant variation in the excited state for the dipole-moment and displayed large Stokes shifts in its absorption and fluorescence spectra. Under suitable pumping conditions, e.g., Nd: YAG laser (λex=355 nm), the compound BDP dissolved in acetone showed a laser peak centered at 525 nm, which could be tuned up to 570 nm when dissolved in solvents with different dielectric constants. The synthesized compound BDP showed a high optical laser gain of the order of 3.2 $cm^{-1}$ in pulsed and continuous-wave (CW) modes and provides an economical, environmentally friendly laser medium.

Figure 5:
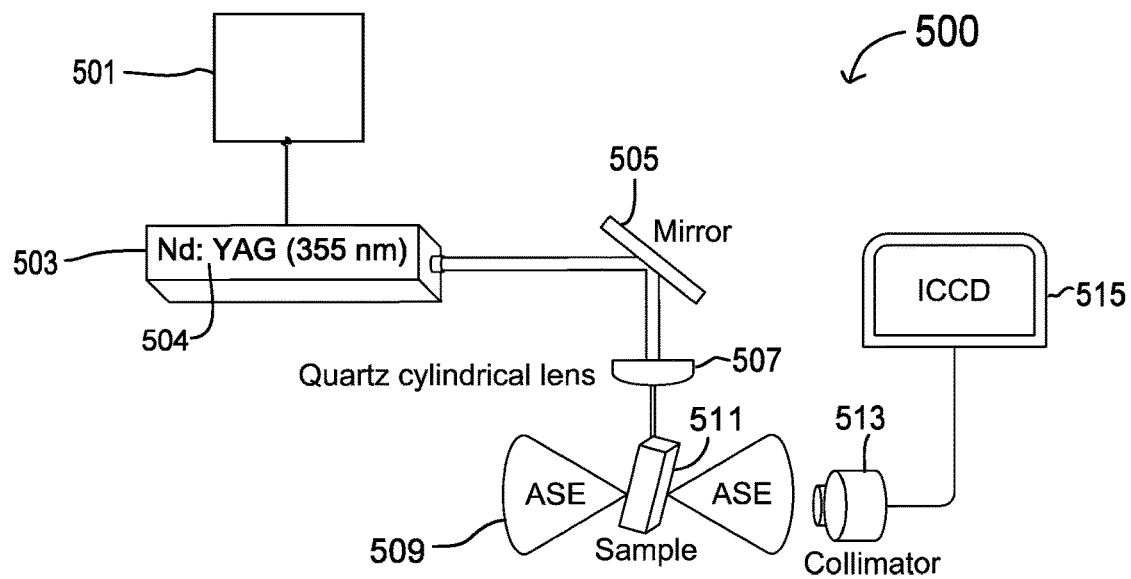
FIG. 5 shows an experimental setup for transverse excitation of the compound BDP in acetone, according to certain embodiments.

Disclosed herein is a laser device 500 capable of emitting a laser as shown in FIG. 5 in accordance with some embodiments of the present disclosure. The laser device 500 includes a pump 501 and a medium container 503 designed to hold a gain medium 504 (e.g., Nd: YAG 355 nm) therein. The gain medium 504 contained in the medium container 503 is configured to receive energy from the pump 501 to emit a laser.

Specifically, the pump 501 is configured to provide energy for the gain medium 504 is also known as a pump source. The type of the pump 501 needed may depend on the type of the gain medium 504 used. Examples of the pump 501 include, but are not limited to, electrical discharges, flashlamps, arc lamps, light from another laser, chemical reactions and explosive devices. In one example, a Nd: YAG laser can use light focused from a xenon flash lamp or diode lasers as the pump 501. In another example, an excimer laser can use a chemical reaction as the pump source. In yet another example, a He: Ne laser may utilize an electrical discharge in a helium-neon gas mixture.

The gain medium 504 is configured to be excited by the pump 501 to produce a population inversion, optical gain, amplification or the like. In one embodiment, the gain medium 504 is in a liquid state and includes a compound dissolved in one or more solvents. In another embodiment, the gain medium 504 includes the compound in a solid state and includes no solvent. In a preferred embodiment, the compound is a derivative of a chalcone compound wherein one of the phenyl rings has N,N-dimethylamino group at its para position, which will be explained in detail later.

The laser device 500 can include various optical components, such as a spinning mirror, a modulator, a filter, an absorber, combinations thereof and the like, to produce a variety of effects on the laser output, such as altering the wavelength of operation or the production of pulses of laser light. In conventional technologies, an optical resonator (also known as an optical cavity or an oscillator), for instance in the form of two parallel mirrors (e.g. a high reflector and an output coupler) placed around the gain medium 504, may be used to provide feedback of the light. However in the present disclosure, such an optical resonator may not be needed. That is, the laser device 500 can rely on a high optical gain of the gain medium 504 to produce significant amplified spontaneous emission (ASE) 509 without needing feedback of the light back into the gain medium 504. As a result, a laser produced by the laser device 500 can be superluminescent and include light with low coherence but high bandwidth.

As illustrated in the example of FIG. 1, no optical resonator is used due to the ASE 509. The laser device 500 does not need mirrors to amplify the laser produced by the gain medium 504, but may include mirrors to direct the laser along a particular optical path without amplification or feedback. In a non-limiting example, the laser is directed by a mirror 505 and a quartz cylindrical lens 507 to a sample 511 before collimated by a collimator 513 and analyzed by a camera 515, such as an intensified charge-coupled device (ICCD) camera. Note that ASE can be a laser without a mirror or feedback and is dependent on the gain medium 504. A gain medium that produces an ASE can also produce a laser, whereas the opposite may not be true.

In some embodiments, the gain medium 504 includes a compound that conforms to formula (I):

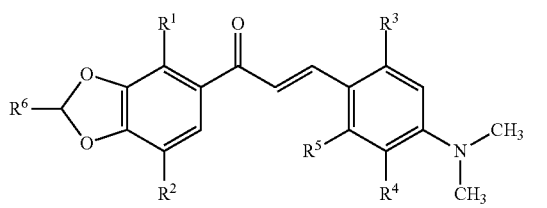

formula (I)

where $R^1$, $R^2$, $R^3$, $R^4$, $R^5$ and $R^6$ are each independently hydrogen or an alkyl group. The alkyl group may be optionally substituted or may be an unsubstituted alkyl.

In some embodiments, the compound dissolved in the first solvent conforms to formula (I):

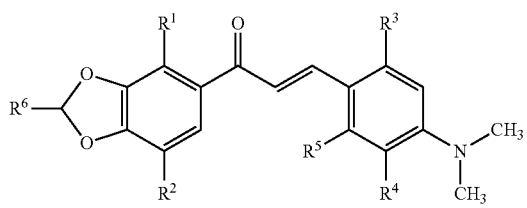

formula (I)

where $R^1$, $R^2$, $R^3$, $R^4$, and R6 are each independently hydrogen or an aliphatic group having 1 to 6 carbon atoms, and R5 is hydrogen, a methyl group, or an ethyl group.

In some embodiments, the compound dissolved in the first solvent conforms to formula (I):

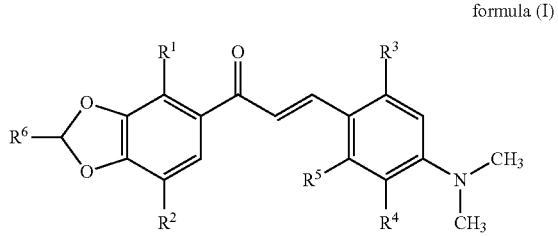

formula (I)

where $R^1$, $R^2$, $R^3$, and $R^4$ are each independently hydrogen, a methyl group, an ethyl group or a propyl group, and $R^5$ is hydrogen or a methyl group.

In some embodiments, the compound dissolved in the first solvent conforms to formula (I):

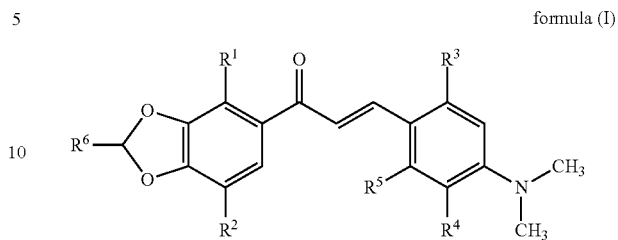

formula (I)

where $R^1$, $R^2$, $R^3$, $R^4$, and $R^6$ are each independently hydrogen or a substituted heteroalkyl group having 1 to 6 carbon atoms.

In some embodiments, the compound dissolved in the first solvent conforms to formula (I):

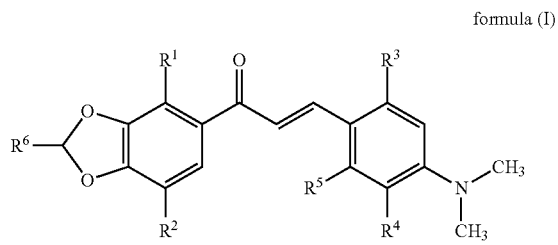

formula (I)

where $R^1$, $R^2$, $R^3$, $R^4$, $R^5$ and $R^6$ are hydrogen.

In some embodiments, when the gain medium 504 is in a liquid state, the chalcone compound derivative is dissolved in a first solvent. The first solvent may be selected from the group consisting of water and a glycol. In some embodiments, the first solvent is a glycol. In a preferred embodiment, the first solvent is ethylene glycol. In some embodiments, the first solvent is water. In some embodiments, the first solvent is a mixture of solvents, such as a mixture of water and a glycol, preferably a mixture of water and ethylene glycol.

The chalcone compound derivative of the present disclosure may be dissolved in a mixture of solvents. Accordingly, the mixture of solvents may include a first solvent and a second solvent. The first solvent may be selected from the group consisting of water and a glycol. The second solvent may be selected from the group consisting of acetone, ethanol, and dimethylformamide. In some embodiments, the first solvent is a glycol, and the second solvent is acetone. In some embodiments, the first solvent is ethylene glycol, and the second solvent is acetone. In some embodiments, the first solvent is water, and the second solvent is ethanol. In one embodiment, the first solvent is a mixture of water and a glycol, and the second solvent is acetone. In some embodiments, the first solvent is a mixture of water and ethylene glycol, and the second solvent may be selected from acetone or dimethylformamide.

In one embodiment, when the gain medium 504 is in a liquid state, the chalcone compound derivative can be dissolved in a solvent or a mixture of solvents in a concentration of 0.1 to 8.0 mg/mL, preferably 0.2 to 7.0 mg/mL, preferably 0.3 to 6.0 mg/mL, preferably 0.4 to 5.0 mg/mL. For example, the chalcone compound derivative can have a concentration of 7.0 mg/mL or 6.0 mg/mL.

In one embodiment, the laser device includes a medium container designed to hold a gain medium wherein the gain medium 504 is in a solid state. The gain medium 504 thus includes a compound in a solid state and no solvent wherein the compound is a chalcone compound derivative. In some embodiments, the chalcone compound derivative in solid state conforms to formula (I):

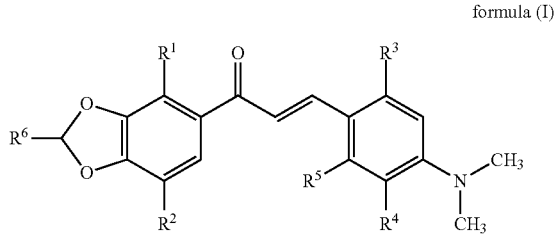

formula (I)

where $R^1$, $R^2$, $R^3$, $R^4$, $R^5$ and $R^6$ are each independently hydrogen or an alkyl group.

In some embodiments, the chalcone compound derivative in solid state conforms to formula (I):

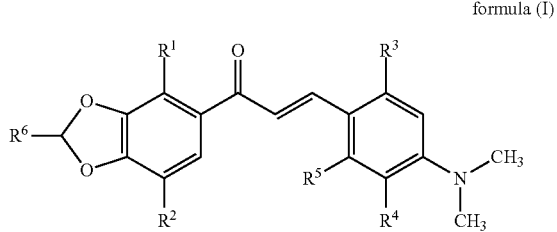

formula (I)

where $R^1$, $R^2$, $R^3$, $R^4$, and R6 are each independently hydrogen or an aliphatic group having 1 to 6 carbon atoms, and R5 is hydrogen, a methyl group, or an ethyl group.

In some embodiments, the chalcone compound derivative in solid state conforms to formula (I):

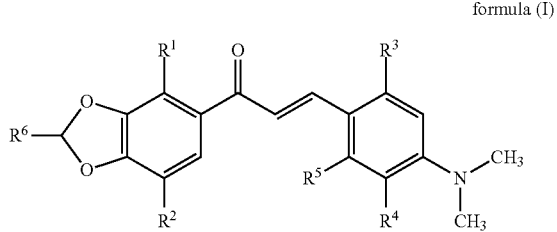

formula (I)

where $R^1$, $R^2$, $R^3$, $R^4$, $R^5$ and $R^6$ are hydrogen.

Referring to FIG. 1, a method 100 of laser production is disclosed. According to the present disclosure, the method 100 corresponds to a method of laser production (shown in FIG. 5). A schematic flow diagram of the method 100 for production of laser is shown in FIG. 1, and the method 100 is further illustrated with reference to the process described in FIG. 5. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes preparing the gain medium 504 by dissolving the chalcone compound of formula (I), in the solvent wherein the concentration of the chalcone compound in the gain medium 504 may be in the range of 0.1 to 8.0 mg/mL. In one embodiment, when the gain medium 504 is in liquid state, the chalcone compound derivative dissolved in the solvent or a mixture of solvents in a concentration of 0.1 to 8.0 mg/mL, preferably 0.2 to 7.0 mg/mL, preferably 0.3 to 6.0 mg/mL, preferably 0.4 to 5.0 mg/mL. In some embodiments, the chalcone compound derivative dissolved in the solvent or a mixture of solvents has a concentration of 7.0 mg/mL. In a preferred embodiment, the chalcone compound derivative dissolved in the solvent or a mixture of solvents has a concentration of 6.0 mg/mL.

At step 104, the method 100 includes providing energy to the gain medium 504 so that the gain medium 504 emits a laser in a range of 525-580 nm. The gain medium 504 is excited to emit the laser and can generate amplified spontaneous emission when stimulated by a suitable pump source. The pump source may be chosen according to its ability to excite the gain medium 504 in both liquid and solid states. Accordingly, the pump source may be a laser. In some embodiments, the pump source may be selected from the group consisting of an Er: YAG laser, a titanium: sapphire laser, and a Nd: YAG laser. In some embodiments, the pump source is an Er: YAG laser. In a preferred embodiment, the pump source is a Nd: YAG laser.

In one embodiment, the gain medium 504 emits a laser in a wavelength range of 525-580 nm, preferably in a wavelength range of 535-570 nm, preferably in a wavelength range of 545-560 nm. The gain medium 504 herein emits a laser that is tunable to specific wavelengths. In some embodiments, the gain medium 504 emits a laser at a wavelength of 530 nm that can be tuned up to a wavelength of 580 nm. In some embodiments, the gain medium 504 emits laser at a wavelength of 525 nm that can be tuned up to 570 nm.

Most existing lasers can either function as pulsed or continuous wave lasers. Pulsed lasers emit light in pulses of short duration, which are repeated after specific time intervals. A continuous wave laser emits light continuously for a specified interval of time. The applications of pulsed and continuous wave lasers depend on the need for different kinds of power outputs. The gain medium 504 can emit light in pulsed and continuous wave mode. The gain medium 504 is readily soluble in a variety of solvents and is thus capable of functioning in a continuous wave manner. In one embodiment, the gain medium 504 emits a mode-locked pulsed laser. Mode locked lasers can emit extremely short pulses of the order of few picoseconds or few femtoseconds. In some embodiments, the gain medium 504 produces mode-locked laser pulses between 10 picoseconds to 100 femtoseconds, preferably between 20 picoseconds to 90 femtoseconds, preferably between picoseconds to 80 femtoseconds.

EXAMPLES

The following examples demonstrate a laser medium as described herein. The examples are provided solely for illustration and are not to be construed as limitations of the present disclosure, as many variations thereof are possible without departing from the spirit and scope of the present disclosure.

Figure 2:
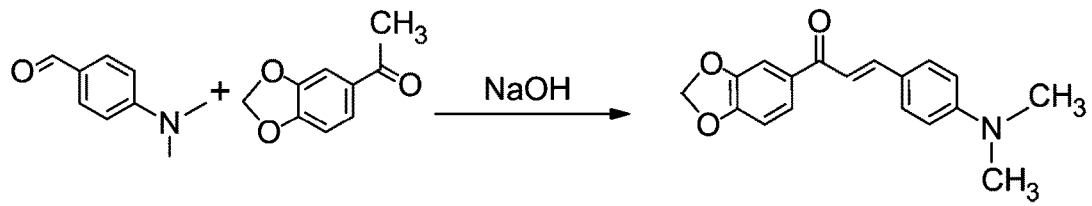
FIG. 2 shows a synthetic scheme for the synthesis of a compound, 1-(2H-1,3-benzodioxol-5-yl)-3-[4-(dimethylamino)phenyl]-(2E)-propen-1-one (BDP), according to certain embodiments.

Example 1: Synthesis of BDP 1-(2H-1,3-benzodioxol-5-yl)-3-[4-(dimethylamino)phenyl]-(2E)-propen-1-one (BDP) was made by combining 0.002 moles of 4-dimethyl aminobenzaldehyde with 0.002 moles of 3',4'-(methylenedioxy) acetophenone in the presence of ethanol as a solvent and sodium hydroxide as a catalyst (FIG. 2). During the overnight stirring of the mixture, the vessel was kept at room temperature. Then, after re-crystallizing in ethanol and washing it with distilled water, a pure final product was made. As a final step, the purified product was allowed to dry. Fourier-Transform Infrared (FTIR), $^1$H nuclear magnetic resonance (NMR) spectroscopy, $^{13}$C NMR, and ultraviolet-visible (UV-Vis) spectroscopy were used to confirm that the product was made in a lab. $^\delta$H (400 MHz, CDCl3, Me4Si) 1.57 (3H, s, Me), 3.0 (6H, s, NMe2), 6.0 (2H, d, J=4.0 Hz), 6.7 (2H, d, J=8.6 Hz), 6.9 (1H, d, J=8.1 Hz), 7.3 (1H, d, J=15.4 Hz), 7.5 (3H, m), 7.6 (1H, d, J=8.1 Hz), 7.8 (1H, d, J=15.4 Hz) ppm. δC: 40 (N(CH$_3$)$_2$); 101.6 (O—CH$_2$—O); 108 (Ph); 108.5 (Ph); 112 (C=C); 117 (C=C); 124 (Ph); 124 (Ph); 130 (Ph); 134 (Ph); 145 (Ph); 148 (Ph); 151 (Ph); 152 (Ph); 188 (C=O). Vmax: 1655 (C=O), 1583 cm-1 (C=C); $^\delta$H (400 MHZ, CDCl$_3$, Me4Si) 1.57 (3H, s, Me), 3.03 (6H, s, NMe$_2$), 6.67 (2H, d, J=9 Hz), 7.26 (1H, d, J=16 Hz), 7.43 (2H, d, J=7 Hz), 7.52 (2H, d, J=9 Hz), 7.77 (1H, d, J=16 Hz), 7.92 (2H, d, J=7 Hz) ppm; λmax (acetone 405 nm).

Example 2: Optical and Laser Properties

Figure 3:
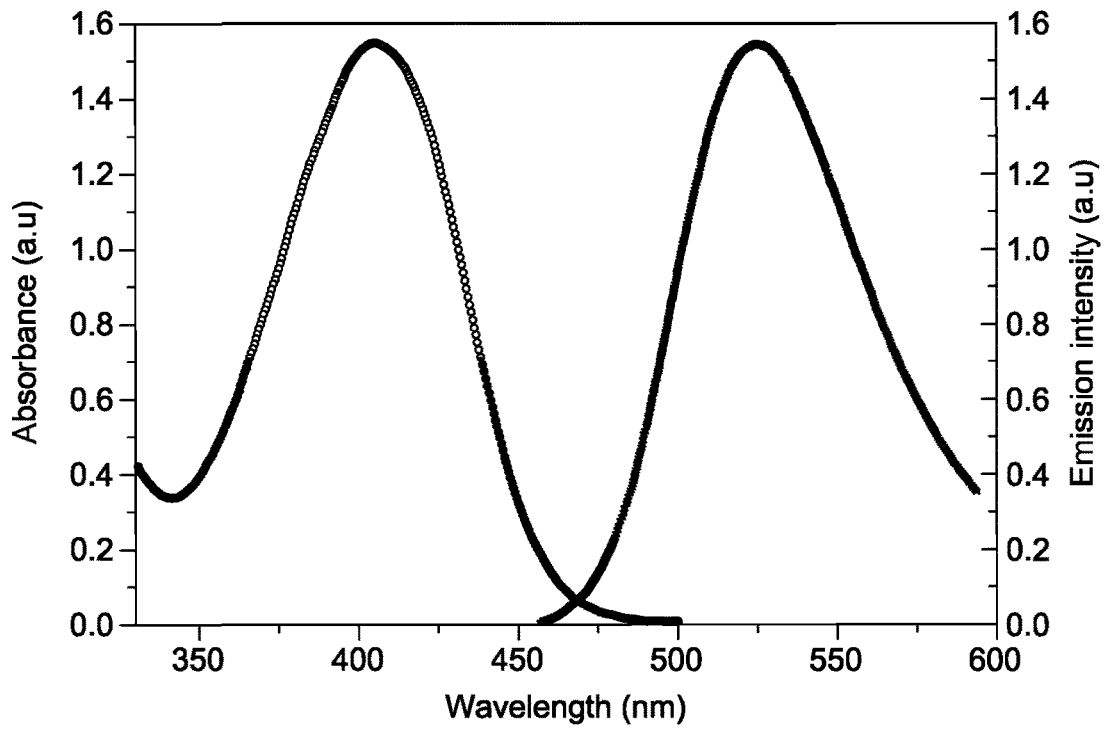
FIG. 3 shows absorption and emission spectra of the compound BDP in acetone, according to certain embodiments.
Figure 4A:
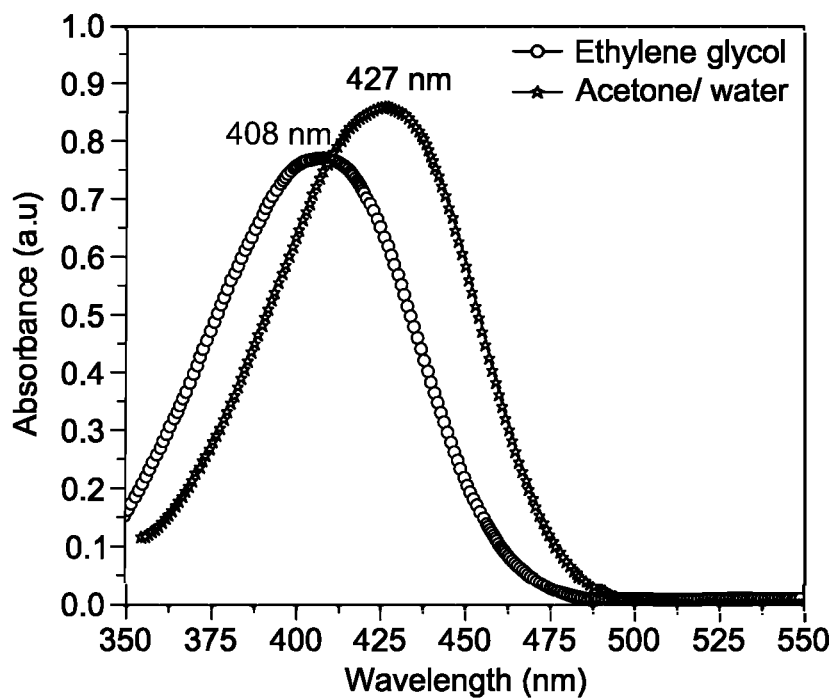
FIG. 4A shows absorption spectra of the compound BDP in ethylene glycol and water mixed with acetone, according to certain embodiments.
Figure 4B:
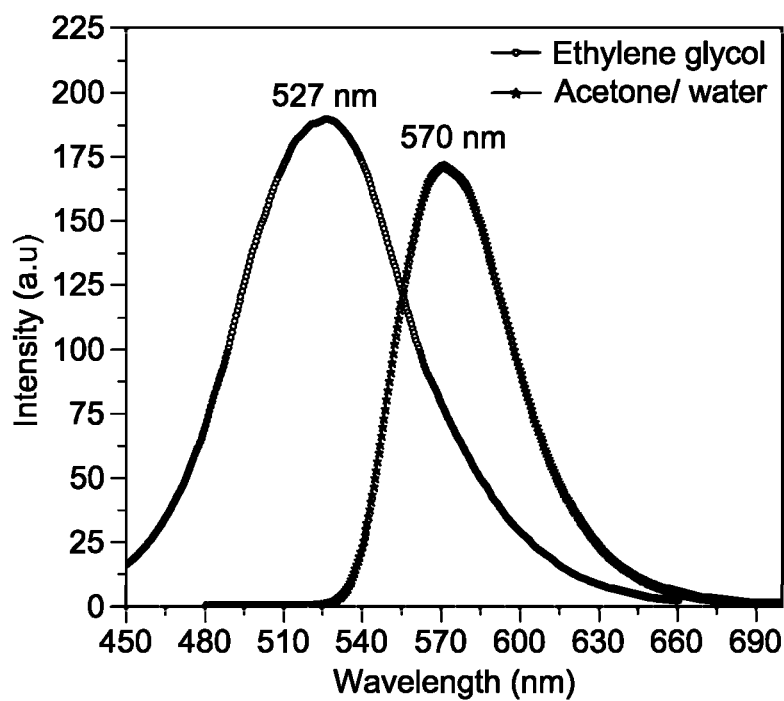
FIG. 4B shows emission spectra of the compound BDP in ethylene glycol and water mixed with acetone, according to certain embodiments.
Figure 6:
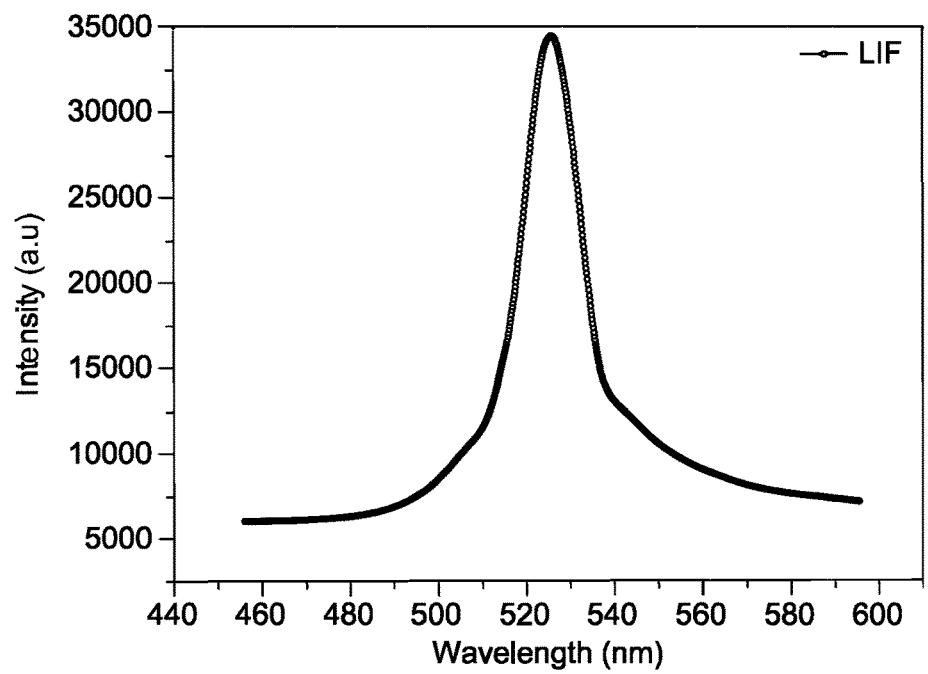
FIG. 6 shows Laser-Induced Fluorescence (LIF) of the compound BDP in acetone, according to certain embodiments.
Figure 7:
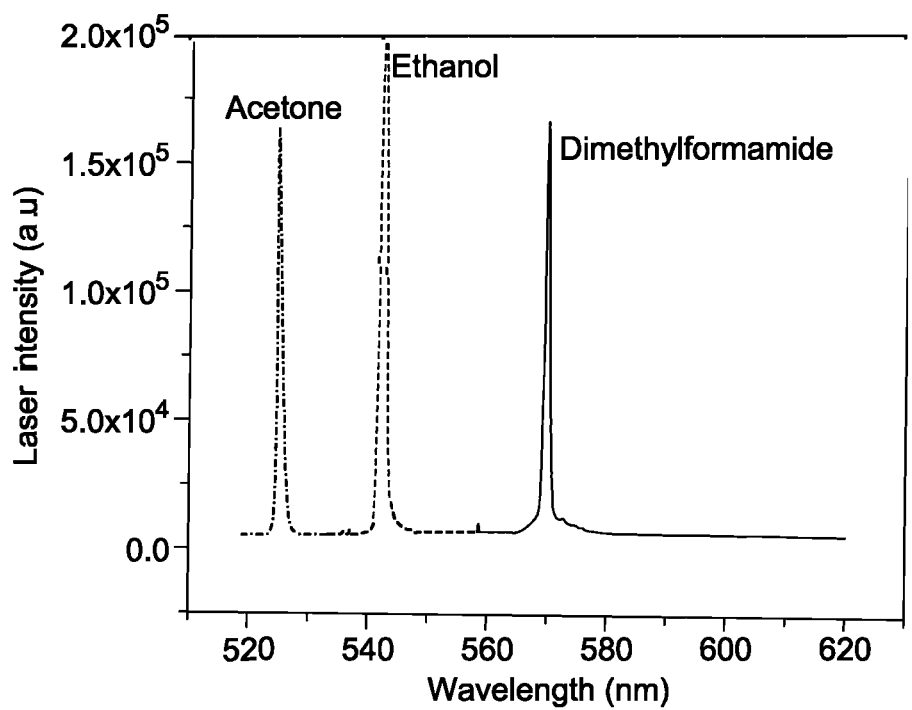
FIG. 7 shows laser spectra of the compound BDP in different solvents, according to certain embodiments.
Figure 8:
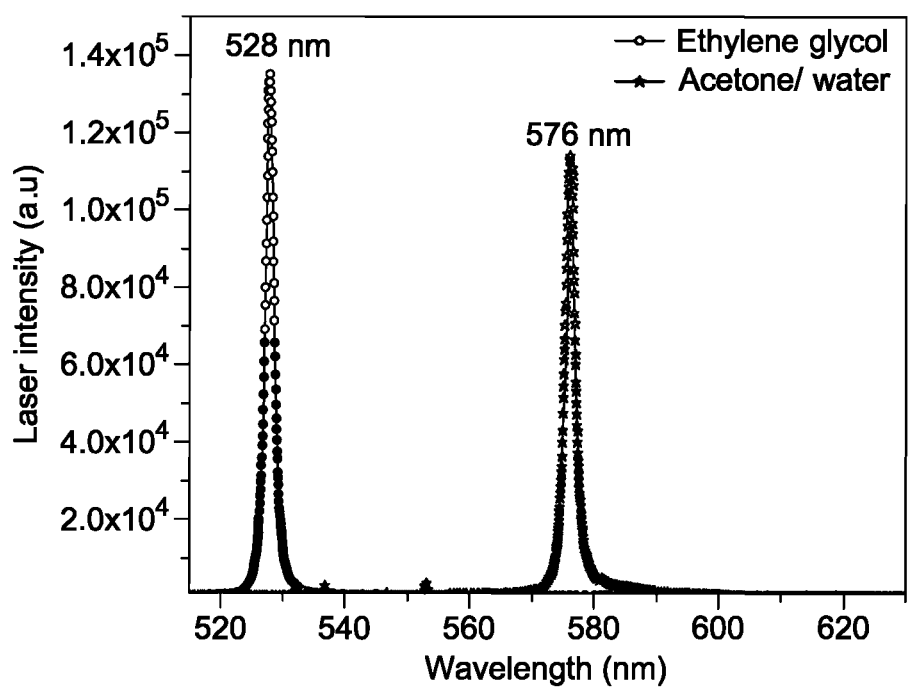
FIG. 8 shows laser spectra of the compound BDP in ethylene glycol and acetone mixed with water, according to certain embodiments.

The powder form of the prepared BDP material was dissolved in acetone at a low concentration (0.5 mg/10 ml). The absorption (emission) spectra of the BDP sample showed only one peak at 405 (525) nm, as shown in FIG. 3. This experiment aimed to examine the effects of combining ethylene glycol and water with acetone on the absorption and fluorescence spectra. The findings demonstrate that the solvents examined substantially impact both the absorption and fluorescence spectra, as depicted in FIG. 4A and FIG. 4B, respectively. The same sample was transversely excited using an Nd: YAG laser (λ=355 nm pulse width of 5 ns, 10 Hz, and pump pulse energy of 2 mJ). The pump beam laser was focused using a cylindrical lens of a focal length of 5 cm and an aperture size of 4×3 cm. The pump irradiance at the focal point was 106 W/m2 (FIG>5). The laser-induced fluorescence (LIF) spectra were recorded at 525 nm with a full-width half maximum (FWHM) of 15 nm (FIG. 6). By increasing the concentration to 6 mg/10 ml, which is enough to make a super-radiant laser at 525 nm with a spectral width of 3 nm and a divergence of 10 mr (FIG. 7), the laser will be very bright. This novel BDP exhibits a higher laser intensity than conventional dyes, such as rhodamine 6G. The optical conversion efficiency was 20% whereas under identical operating conditions, a rhodamine 6G solution was excited and had a conversion of 15% only. The laser spectrum of BDP in a mixture of ethylene glycol and a mixture of water and acetone was recorded under identical operational conditions, as depicted in FIG. 8. The findings demonstrated a spectral shift towards longer wavelengths, commonly referred to as a redshift, in this particular solvent mixture when compared to alternative solvents. The photochemical stability of the BDP was also studied and compared with the one from rhodamine 6G under the same operational conditions. After 7200 pulses, the laser intensity of the BDP remained unchanged, whereas rhodamine 6G dropped to 50% of its initial intensities after 600 pulses and disappeared completely at 3500 pulses. The optical gain was measured under different pump pulse energies from 6 mJ to 10 mJ; the excitation wavelength was 355 nm. The laser intensity was measured for two lengths of excitation: l1=5 cm and l2=2 cm. The results show that the BDP has an optical gain of 3.2 cm^(−1), which could be considered one of the highest gains obtainable from laser media.

Compared with existing rhodamine 6G lasers, the BDP herein is easily soluble in a variety of solvents, such as water and ethylene glycol, which is essential for CW laser action. Ethylene glycol is mandatory to produce a thin jet of dye solution and water, with a high level of specific heat that would keep the temperature of the laser active region in a functional range.

Failures in these two aspects have prevented CW lasers from being used with coumarin series or many other efficient laser materials. Nevertheless, the BDP can work in CW laser, producing mode lock laser pulses between 10 ps and 100 fs. Therefore, the BDP is unique and has potential and commercial viability particularly for laser manufacturers.

Numerous modifications and variations of the present disclosure are possible in light of the above teachings. It is, therefore, to be understood that within the scope of the appended claims, the invention may be practiced otherwise than as specifically described herein.

The invention claimed is:
1. A laser device, comprising:
a medium container;
a gain medium contained in the medium container and configured to receive energy to emit a laser via amplified spontaneous emission (ASE), the gain medium comprising a first solvent and a compound dissolved therein; and
optics configured to direct the laser, the optics including no optical resonator around the gain medium,
wherein the compound conforms to formula (1):

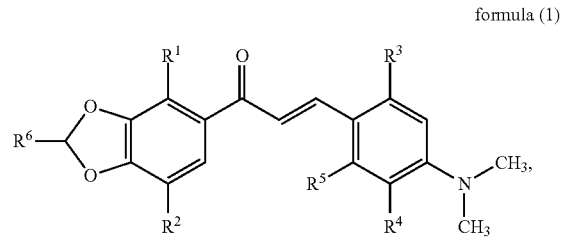

formula (1)

where $R^1$, $R^2$, $R^3$, $R^4$, $R^5$ and $R^6$ are each independently hydrogen or an alkyl group or a substituted heteroalkyl group having 1 to 6 carbon atoms.
2. The laser device of claim 1, wherein:
the first solvent includes at least one selected from the group consisting of ethylene glycol and water.
3. The laser device of claim 2, further comprising:
a second solvent selected from the group consisting of acetone, ethanol and dimethylformamide.
4. The laser device of claim 1, wherein:
where $R^1$, $R^2$, $R^3$, $R^4$ and $R^6$ are each independently hydrogen or an aliphatic group having 1 to 6 carbon atoms or a substituted heteroalkyl group having 1 to 6 carbon atoms, and
$R^5$ is hydrogen, a methyl group or an ethyl group.
5. The laser device of claim 4, wherein:
$R^1$, $R^2$, $R^3$ and $R^4$ are each independently hydrogen, a methyl group, an ethyl group or a propyl group, and
$R^5$ is hydrogen or a methyl group.
6. The laser device of claim 4, wherein:
$R^1$, $R^2$, $R^3$, $R^4$ and $R^6$ are each independently hydrogen or a substituted heteroalkyl group having 1 to 6 carbon atoms.

7. The laser device of claim 1, wherein:
$R^1$, $R^2$, $R^3$, $R^4$, $R^5$ and $R^6$ are hydrogen.

8. The laser device of claim 1, further comprising:
a pump source configured to provide actinic energy to the gain medium so that the gain medium is excited to emit the laser.

9. The laser device of claim 1, wherein:
the gain medium is configured to emit the laser in a range of 525-580 nm, and
the compound has a concentration of 0.1-8.0 mg/mL in the gain medium.

10. A method of laser production, the method comprising:
providing energy to a gain medium so that the gain medium emits a laser in a range of 525-580 nm via amplified spontaneous emission (ASE), wherein
the gain medium comprises a first solvent and a compound dissolved therein,
the compound has a concentration of 0.1-8.0 mg/mL in the gain medium,
the compound conforms to formula (1):

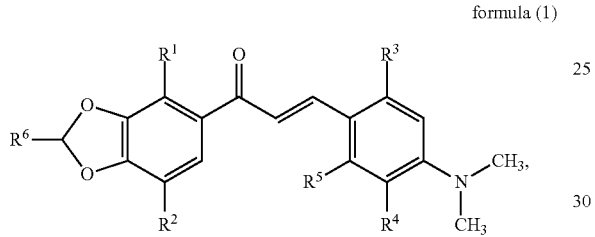

formula (1)

where $R^1$, $R^2$, $R^3$, $R^4$, $R^5$ and $R^6$ are each independently hydrogen or an alkyl group or a substituted heteroalkyl group having 1 to 6 carbon atoms.

11. The method of claim 10, wherein:
the first solvent includes at least one selected from the group consisting of ethylene glycol and water.

12. The method of claim 11, further comprising:
a second solvent selected from the group consisting of acetone, ethanol and dimethylformamide.

13. The method of claim 10, wherein:
where $R^1$, $R^2$, $R^3$, $R^4$ and $R^6$ are each independently hydrogen or an aliphatic group having 1 to 6 carbon atoms or a substituted heteroalkyl group having 1 to 6 carbon atoms, and
$R^5$ is hydrogen, a methyl group or an ethyl group.

14. The method of claim 13, wherein:
$R^1$, $R^2$, $R^3$ and $R^4$ are each independently hydrogen, a methyl group, an ethyl group or a propyl group, and
$R^5$ is hydrogen or a methyl group.

15. The method of claim 13, wherein:
$R^1$, $R^2$, $R^3$, $R^4$ and $R^6$ are each independently hydrogen or a substituted heteroalkyl group having 1 to 6 carbon atoms.

16. The method of claim 10, wherein:
$R^1$, $R^2$, $R^3$, $R^4$, $R^5$ and $R^6$ are hydrogen.

17. The method of claim 10, further comprising:
providing energy to the gain medium in a pulsed or continuous-wave mode.

18. A laser device, comprising:
a medium container;
a gain medium contained in the medium container and configured to receive energy to emit a laser via amplified spontaneous emission (ASE), the gain medium comprising a compound in solid state and no solvent; and
optics configured to direct the laser, the optics including no optical resonator around the gain medium,
wherein the compound conforms to formula (1):

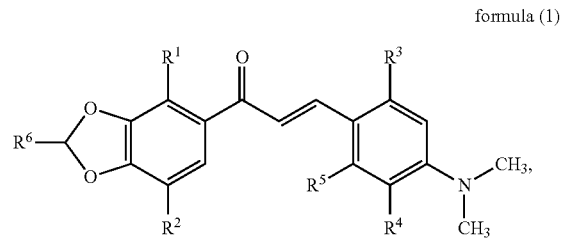

formula (1)

where $R^1$, $R^2$, $R^3$, $R^4$, $R^5$ and $R^6$ are each independently hydrogen or an alkyl group or a substituted heteroalkyl group having 1 to 6 carbon atoms.

19. The laser device of claim 18, wherein:
$R^1$, $R^2$, $R^3$, $R^4$ and $R^6$ are each independently hydrogen or an aliphatic group having 1 to 6 carbon atoms, and
$R^5$ is hydrogen, a methyl group or an ethyl group.

20. The laser device of claim 18, wherein:
$R^1$, $R^2$, $R^3$, $R^4$, $R^5$ and $R^6$ are hydrogen.

* * * * *